B. H. DIVINE.
METHOD OF CONSTRUCTING TIRES.
APPLICATION FILED MAY 20, 1912.
1,084,409.
Patented Jan. 13, 1914.
4 SHEETS—SHEET 1.
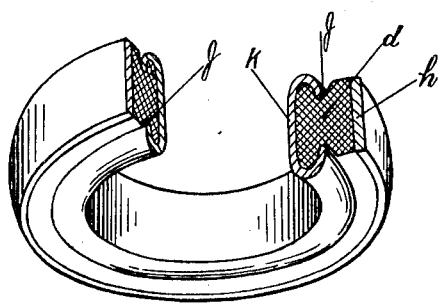
Fig-6
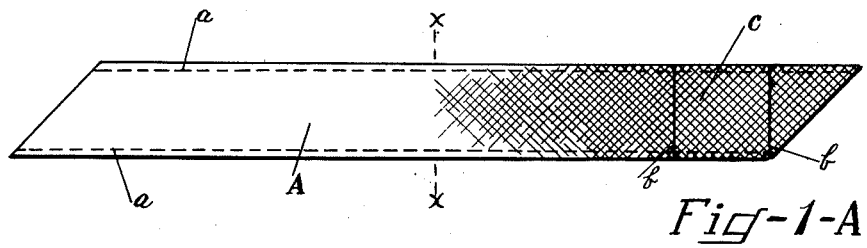
Fig-1-A
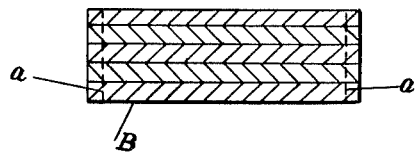
Fig-1-B
WITNESSES:
L. C. Snyder
E. T. DeGiorgi
INVENTOR
BRADFORD H. DIVINE.
BY Henry M. Love
ATTORNEY

B. H. DIVINE.
METHOD OF CONSTRUCTING TIRES.
APPLICATION FILED MAY 20, 1912.

1,084,409.

Patented Jan. 13, 1914.
4 SHEETS—SHEET 2.

WITNESSES:
L. C. Snyder.
E. J. DeGiorgi.

INVENTOR
BRADFORD H. DIVINE.
BY Henry M. Love
ATTORNEY

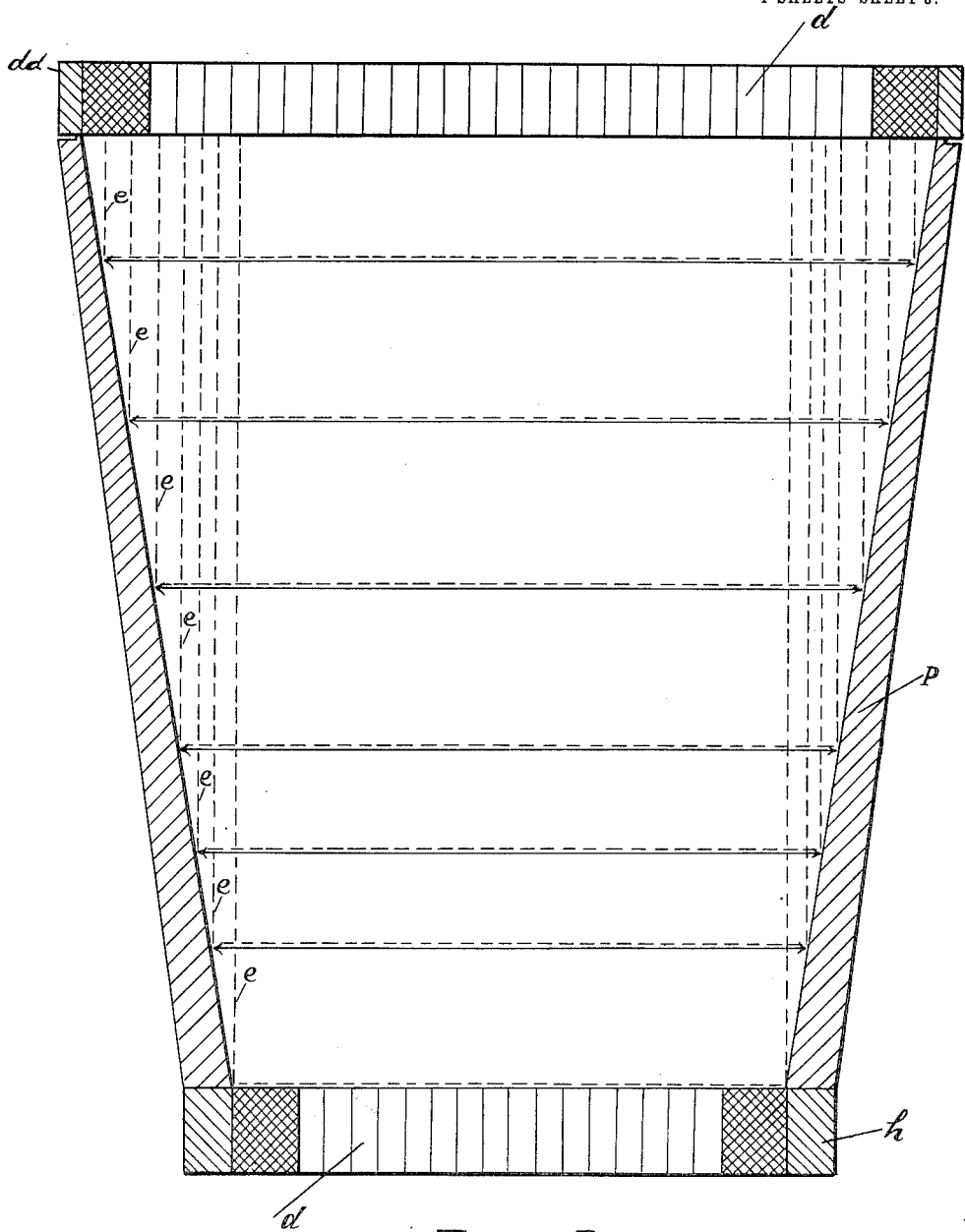

B. H. DIVINE.
METHOD OF CONSTRUCTING TIRES.
APPLICATION FILED MAY 20, 1912.

1,084,409.

Patented Jan. 13, 1914.

WITNESSES:
L. C. Snyder
E. T. De Giorgi

INVENTOR
BRADFORD H. DIVINE.
BY
Henry M. Love
ATTORNEY

UNITED STATES PATENT OFFICE.

BRADFORD H. DIVINE, OF UTICA, NEW YORK.

METHOD OF CONSTRUCTING TIRES.

1,084,409.  Specification of Letters Patent.  Patented Jan. 13, 1914.

Application filed May 20, 1912. Serial No. 698,400.

*To all whom it may concern:*

Be it known that I, BRADFORD H. DIVINE, a citizen of the United States, residing at Utica, in the county of Oneida and State of New York, have invented certain new and useful Improvements in Methods of Constructing Tires, of which the following is a specification, reference being had therein to the accompanying drawing.

My invention consists in the method of constructing a tire for wheeled vehicles from a plurality of pieces of woven fabric placed side by side when cut to the proper size and compressed from a larger to a smaller diameter and applying thereto a permanent binding member.

The object of my invention is to produce an attachable and detachable tire for use on wheeled vehicles that will stand great wear and pressure without slipping, skidding or having any of the defects incident to tires composed in whole or in part of other material.

The material which is used in my tire is woven canvas cut to the required size and shaped and compressed from a larger to a smaller diameter, and in applying thereto, when compressed to the required size, a permanent binding member.

Other features of my process are hereinafter more particularly pointed out.

In the drawings Figure 1ᴬ is a plan view of diagonal strip of woven fabric; Fig. 1ᴮ is a cross-section of the fabric on the line *x—x* of Fig. 1ᴬ, section lines being shown instead of undertaking to show the fabric; Fig. 2 is a vertical section of the conical shaped tube, broken lines indicating parts removed; Fig. 3 is a vertical section of the conical tube, assembling ring and temporary holding ring; Fig. 4 is a cross section of the tire, temporary holding ring and the permanent binding member partially located; Fig. 5 is a cross section of the tire and permanent binder with the temporary holding ring removed; Fig. 6 is a section of the tire, the temporary holding ring and the permanent binding member, and Fig. 7 is a cross section of a tire of modified construction with the permanent binding member in position.

In Fig. 1ᴬ is illustrated a strip of canvas cut diagonally to the weave of the fabric. For convenience in handling and expediting the work I place several pieces of canvas, one upon the other, on a table, the pieces extended and cut in strips diagonally to the weave, as shown in Fig. 1ᴬ, and the edges of these strips are preferably sewed together, as at *a, a*. They may be otherwise held, if desired. I then cut the diagonal strips of canvas into the required shape, in which in this instance I illustrate as at *c* on the lines *b, b* of Fig. 1ᴬ. In the drawings the section *c* is rectangular in shape for convenience in illustrating the same, but these sections can be cut in any desired form or shape.

As a part of the process of manufacture I extract or drive off all moisture from the fabric and then treat the fabric with commercial waterproofing which is readily absorbed into the fabric. The sections of fabric *d*, are assembled side by side in a temporary assembling or holding ring *d d*, Figs. 2 and 3. The strips of fabric are placed in the assembling band sufficiently tight to hold them in position. This is done preferably by the hand of the operator. The temporary assembling ring *d d* with the sections of fabric located therein is then placed over an inverted conical shaped tube P. The inverted conical-shaped tube shown in Fig. 2 represents a sectional tube, and the tube shown in Fig. 3 the walls of the same are continuous from the larger to the smaller diameter. The temporary assembling ring with the sections of fabric located therein is placed over the large end of the inverted conical tube P.

Driving member *e*, shown in Fig. 2, consists of a ring. Instead of using a ring a succession of blocks, plugs or any other means of exerting force on the canvas may be used, which, when pressure is applied, by the head *f* of a power press, Fig. 2, attached to the stem *g* of the power press, drives the sections of fabric in the temporary holding ring downward in the tube as far as the driving member *e* will go without wedging in the inverted conical shaped tube. A succession of members *e* may be used or any compression method may be used to compress the tire into compact form. The driving of the sections of fabric through the tube may be done through a tube in sections or through a tube as a whole.

By applying pressure to the sections of fabric forming the ring or tire, the pressure being applied to the fabric parallel to the axis of the conical tube compressing the fabric toward the axis of the conical tube gradually decreases the fabric from a larger to a smaller diameter until the required size of the tire is reached.

If the conical tube is made in sections, when the fabric is crowded down to the bottom of the section, a new driving member is placed under the head of the press and the fabric is driven into the next section of the conical tube. Repetition of these processes is continued until the tire reaches the size required.

When the fabric is driven in the inverted conical shaped tube to a point where the size of the tire required is obtained, the same is driven into a temporary holding ring $h$ at the small end of the conical shaped tube. After the fabric is forced into this temporary holding ring $h$, the interior diameter of the tire is trued up so as to make it a perfect circle. The internal diameter and the opposite sides of the compressed fabric may be turned up in a machine lathe or by operating on the same with a rotary cutter of any desired form for accomplishing the work.

The side of the tire, as at J, J, may be shaped to receive a permanent holding member K which fits that portion of the side of the tire which has been prepared to receive it, and is seated thereon by pressure, as illustrated in Figs. 4 and 5, thereby applying a permanent binder to the entire interior diameter of the tire and holding the same on opposite sides of the tire. While in the figures shown in the drawings the sides of the tire are shown with grooves, the tire can be prepared for receiving the permanent binder by cutting the sections so that they will project at the sides of the tire, as shown in Fig. 7, or the permanent binder may be held on the tire in any other manner so long as a permanent binder is provided and employed.

The processes of truing the internal diameter of the tire and finishing up the opposite sides of the tire are carried on when the tire is held in the temporary holding band which is maintained in its position until the permanent binding member is secured to the tire on its internal diameter and lateral edges, and when this is accomplished the temporary binder is removed and the tire is complete for placing it upon a wheel vehicle.

For preventing the tire from creeping in the permanent binding member I provide a series of projections $m$, shown in Figs. 4 and 5. Fig. 4 is a cross-section of the tire with the temporary binding member $h$ on the periphery thereof and showing the permanent binder locked to the fabric on one side and the other side, K K, in position to be driven by pressure into the position shown at K, K, in Fig. 5. As heretofore stated, the particular form of the permanent binder may be changed and instead of grooves J, J, the binder may engage projecting edges of the sections composing the tire as shown in Fig. 7.

The principal feature of my method consists in compressing sections of woven fabric cut in the required form and placed transversely side by side in a temporary holding ring and applying pressure thereto to drive the fabric through an inverted conical shape tube, thereby compressing the fabric from a larger to a smaller diameter into a compact form and applying thereto a permanent binding member which will enable the tire to be attached to or detached from the rim of a wheel.

Fig. 6 shows a section of tire constructed by my method, with a permanent binder thereon with a holding ring on the periphery of the same. After the permanent binder is applied and secured to the lateral edges of the tire, the same is driven by force or pressure out of the temporary holding ring and the tire is then in shape to be attached to and detached from the rim of a wheel.

Figure 2:
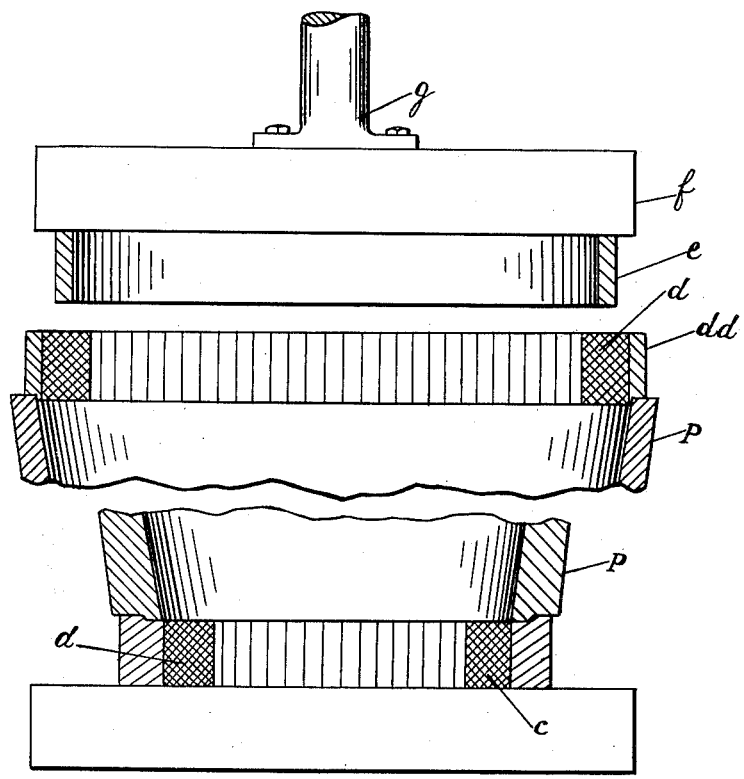
Figure 7:
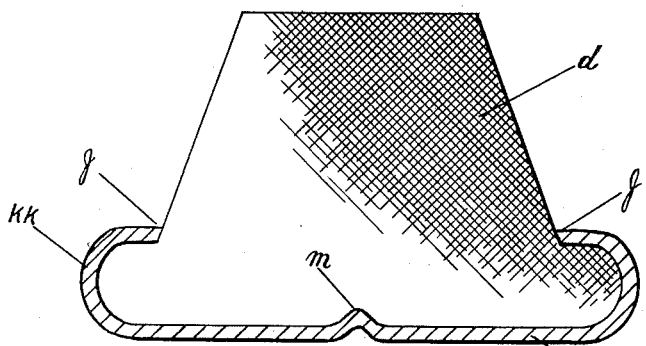
Fig. 7 is a sectional view of the tire showing the binder overlapping and surrounding the projections on the opposite sides of the tire.
Figure 4:
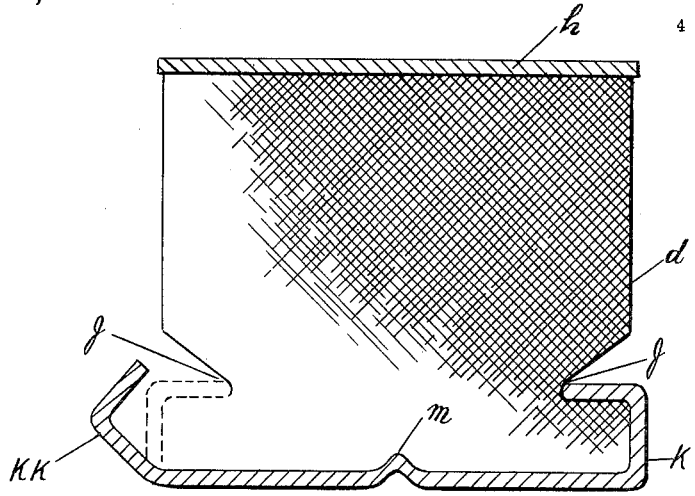
Figure 5:
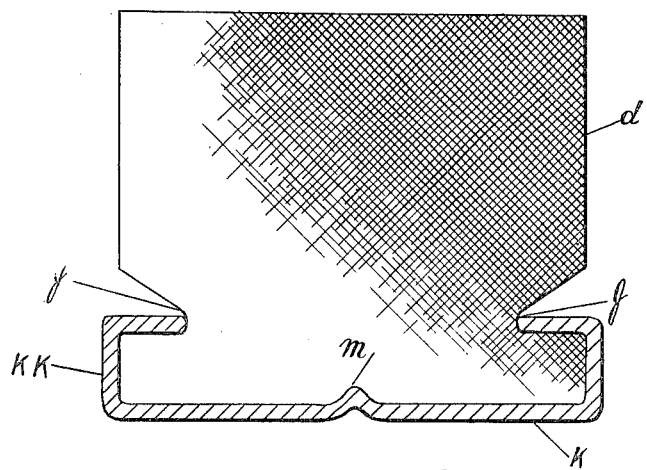

Changes and modifications in the form of the devices used may readily suggest themselves to one skilled in the art, without departing from the spirit and scope of my invention.

Having described my invention, what I claim as new and desire to secure by Letters Patent, is:

1. The method of producing tires for vehicle wheels which consists in assembling woven fabric sections cut on the bias side by side into annular form, compressing said annular form into a compact mass of the required external diameter having its circumferential wearing surface composed of thread ends, applying and securing a permanent binder at the internal diameter of said annular mass while the same is held under exterior pressure, and then removing the exterior pressure.

2. In the method of making tires for vehicle wheels; assembling radially and side by side into ring form a series of woven fabric sections cut on the bias, compressing said ring of fabric sections radially into a compact mass with the circumferential surface thereof composed of thread ends, forcing said compact mass into a rigid temporary binder, applying a permanent binder to the interior of said compact mass, and removing the temporary binder.

3. The method of producing tires for vehicle wheels which consists in assembling woven fabric sections cut on the bias side by side into annular form, compressing said annular form into a compact mass with its circumferential surface composed of thread ends, shaping the interior and sides of the compact mass while the same is held under exterior circumferential pressure, applying a permanent binder to the interior of said annular mass while the same is held exteriorly compressed, and removing the exterior pressure after the permanent binder has been applied to said mass.

4. The method of forming a tire for vehicle wheels which consists in assembling a plurality of flat sections side by side into annular form, compressing the assembled sections radially from a larger to a smaller diameter into a compact annular mass of approximately the external diameter of the tire, temporarily and circumferentially holding the annular compressed mass during the process of applying a permanent holding member, applying to the annular compressed mass a permanent holding member for securing the same in usable form, and then removing the temporary holding member.

In testimony whereof I hereunto affix my signature in the presence of two witnesses.

BRADFORD H. DIVINE.

Witnesses:
  HELEN M. MCLAUGHLIN,
  ELEANOR T. DE GIORGI.